United States Patent
Kim et al.

(10) Patent No.: US 10,586,094 B2
(45) Date of Patent: Mar. 10, 2020

(54) APPARATUS AND METHOD FOR RECOGNIZING FINGERPRINT

(71) Applicant: SAMSUNG ELECTRONICS CO., LTD., Suwon-si (KR)

(72) Inventors: Jungwoo Kim, Hwaseong-si (KR); Hoon Song, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 127 days.

(21) Appl. No.: 15/819,038

(22) Filed: Nov. 21, 2017

(65) Prior Publication Data
US 2018/0204035 A1 Jul. 19, 2018

(30) Foreign Application Priority Data
Jan. 19, 2017 (KR) .......................... 10-2017-0009375

(51) Int. Cl.
*G06K 9/00* (2006.01)
*G06F 3/042* (2006.01)

(52) U.S. Cl.
CPC ........... *G06K 9/001* (2013.01); *G06F 3/0421* (2013.01); *G06K 9/0004* (2013.01); *G06F 2203/04109* (2013.01)

(58) Field of Classification Search
CPC .... G06K 9/0002; G06K 9/0004; G06K 9/001; G06K 9/22; G06F 3/0416; G06F 3/042;
(Continued)

(56) References Cited

U.S. PATENT DOCUMENTS 8,943,580 B2 1/2015 Fadell et al.
2014/0355846 A1 12/2014 Lee et al.
(Continued)

FOREIGN PATENT DOCUMENTS

KR 10-2015-0059450 A 6/2015
KR 10-2016-0048646 A 5/2016
(Continued)

OTHER PUBLICATIONS

Communication dated Jul. 13, 2018, issued by the European Patent Office in counterpart European Patent Application No. 18150199.0.

*Primary Examiner* — Daniel G Mariam
(74) *Attorney, Agent, or Firm* — Sughrue Mion, PLLC

(57) ABSTRACT

An apparatus and method for recognizing a fingerprint are provided. The apparatus includes a display device including a plurality of pixels configured to be turned on and off based on an image signal, a transparent cover disposed on the display device, the transparent cover including a touch surface through which a touch of a user is input, and a touch sensor configured to recognize a location of the touch through the touch surface. The apparatus further includes a fingerprint sensor configured to detect light that is reflected from the touch surface, based on the fingerprint of the user inputting the touch, and generate a signal, based on the light, and a controller configured to generate the image signal to turn on pixels corresponding to the location among the plurality of pixels, and determine a fingerprint profile of the fingerprint, based on the signal generated by the fingerprint sensor.

20 Claims, 8 Drawing Sheets

(58) Field of Classification Search
CPC .................. G06F 3/044; G06F 3/0428; G06F 2203/04106; G06F 2203/04109
USPC ........................................................ 382/124
See application file for complete search history.

(56) References Cited

U.S. PATENT DOCUMENTS

| | | |
|---|---|---|
| 2015/0109214 A1 | 4/2015 | Shi et al. |
| 2015/0310251 A1 | 10/2015 | Wyrwas et al. |
| 2016/0224819 A1 | 8/2016 | Kim et al. |
| 2016/0247010 A1 | 8/2016 | Huang et al. |
| 2016/0349882 A1 | 12/2016 | Liu et al. |
| 2017/0147865 A1* | 5/2017 | Jensen ............... G06K 9/00053 |
| 2018/0129798 A1* | 5/2018 | He ...................... G06K 9/00013 |
| 2018/0197932 A1* | 7/2018 | Ho ...................... H01L 27/3276 |

FOREIGN PATENT DOCUMENTS

| | | |
|---|---|---|
| WO | 2010/083335 A1 | 7/2010 |
| WO | 2015/156432 A1 | 10/2015 |

* cited by examiner

APPARATUS AND METHOD FOR RECOGNIZING FINGERPRINT

CROSS-REFERENCE TO RELATED APPLICATION

This application claims priority from Korean Patent Application No. 10-2017-0009375, filed on Jan. 19, 2017 in the Korean Intellectual Property Office, the disclosure of which is incorporated herein by reference in its entirety.

BACKGROUND

1. Field

Apparatuses and methods consistent with example embodiments relate to recognizing fingerprints on display screens.

2. Description of the Related Art

The demand for personal authentication by using unique characteristics of a person, such as fingerprint, voice, face, hand, or iris, has increased. Personal authentication is mainly used in, for example, financial devices, access control devices, mobile devices, and notebook computers. As mobile devices such as smartphones have recently become more widely distributed, apparatuses for recognizing fingerprints to authenticate users have been used to protect a large amount of security information stored in the mobile devices.

In a smartphone, a touchscreen device is attached to a display apparatus and an input interface that may be intuitively provided to a user. In general, an apparatus for recognizing a fingerprint is provided separately from the touchscreen device, and the apparatus may recognize a fingerprint only when a preset location is touched.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide apparatuses and methods for recognizing fingerprints on display screens.

According to an aspect of an example embodiment, there is provided an apparatus for recognizing a fingerprint, the apparatus including a display device including a plurality of pixels configured to be turned on and off based on an image signal, a transparent cover disposed on the display device, the transparent cover including a touch surface through which a touch of a user is input, and a touch sensor configured to recognize a location of the touch through the touch surface. The apparatus further includes a fingerprint sensor configured to detect light that is reflected from the touch surface due to the fingerprint of the user inputting the touch, and generate a signal, based on the light, and a controller configured to generate the image signal to turn on pixels corresponding to the location among the plurality of pixels, and determine a fingerprint profile of the fingerprint, based on the signal generated by the fingerprint sensor.

The transparent cover may further include side surfaces connected to the touch surface, and the fingerprint sensor may include one or more photodiodes disposed adjacent to one or more of the side surfaces.

The one or more photodiodes may be respectively disposed adjacent to the side surfaces.

The fingerprint sensor may further include one or more light focusing members configured to focus light from the side surfaces to the one or more photodiodes.

The fingerprint sensor may further include a summer configured to sum signals that are generated by the one or more photodiodes.

The fingerprint sensor may further include an amplifier configured to amplify the signals summed by the summer.

The fingerprint sensor may further include a switching device configured to switch the signals summed by the summer.

The transparent cover further may include side surfaces connected to the touch surface, and the fingerprint sensor may include a light detecting member surrounding the side surfaces, and including a photoconductive material, and a circuit element configured to measure a change in an electrical resistance of the light detecting member due to the light that is incident on the light detecting member.

The fingerprint sensor further may further include an amplifier configured to amplify the signal that is generated by the light detecting member.

The fingerprint sensor may further include a switching device configured to switch the signal that is generated by the light detecting member.

The controller may include a pixel driver configured to drive the pixels corresponding to the location of the touch, a reader configured to determine either one or both of valleys and ridges of the fingerprint, based on the signal generated by the fingerprint sensor, and a fingerprint profile extractor configured to extract the fingerprint profile by associating the pixels driven by the pixel driver with either one or both of the valleys and ridges determined by the reader.

The controller may further include a touch area setter configured to set a touch area to be a predetermined size including the location of the touch.

The pixel driver may be further configured to sequentially drive pixels in the touch area set by the touch area setter, among the plurality of pixels, and the reader may be further configured to determine either one or both of the valleys and the ridges of the fingerprint, in synchronization with the driving of the pixel driver.

A resolution of the display device may be greater than or equal to 500 pixels per inch.

An electronic device may include the apparatus.

According to an aspect of another example embodiment, there is provided a method of recognizing a fingerprint, the method including emitting light for fingerprint recognition to a touch surface, by selectively driving one or more of a plurality of pixels included in a display device, and detecting light that is reflected from the touch surface among the light for fingerprint recognition, due to the fingerprint of a user.

The method may further include recognizing a location of a touch of the user that is input through the touch surface, and setting a screen area for recognizing the fingerprint, based on the location. The emitting of the light for fingerprint recognition may include sequentially driving pixels corresponding to the screen area among the plurality of pixels.

The detecting of the light reflected from the touch surface may include detecting the light reflected from the touch surface in synchronization with the driving of the pixels corresponding to the screen area, and the method may further include determining either one or both of valleys and ridges of the fingerprint, based on the light that is detected, and determining a fingerprint profile by associating the pixels that are driven with either one or both of the valleys and ridges that are determined.

The detecting of the light reflected from the touch surface may include detecting the light reflected from the touch surface, using a photodiode or a photoconductor.

According to an aspect of another example embodiment, there is provided an apparatus for recognizing a fingerprint, the apparatus including a display device including a plurality of pixels, a transparent cover disposed on the display device, the transparent cover including a touch surface through which a touch is input, and a touch sensor disposed between the display device and the transparent cover, and configured to recognize a location of the touch through the touch surface. The apparatus further includes a fingerprint sensor surrounding the touch surface, the fingerprint sensor being configured to detect light that is reflected from the touch surface due to the fingerprint of the touch, and a controller configured to turn on pixels corresponding to the location that is recognized, among the plurality of pixels, and recognize the fingerprint, based on the light that is detected.

The controller may be further configured to determine either one or both of valleys and ridges of the fingerprint, based on the light that is detected, and extract a fingerprint profile of the fingerprint by associating the pixels corresponding to the location that is recognized with either one or both of the valleys and ridges that are determined.

The fingerprint sensor may include one or more photodiodes configured to detect the light reflected from the touch surface, and one or more light focusing members configured to focus the light reflected from the touch surface to the one or more photodiodes.

The fingerprint sensor may include a light detecting member including a photoconductive material configured to generate charges, based on the light reflected from the touch surface; and a circuit element configured to collect the charges.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
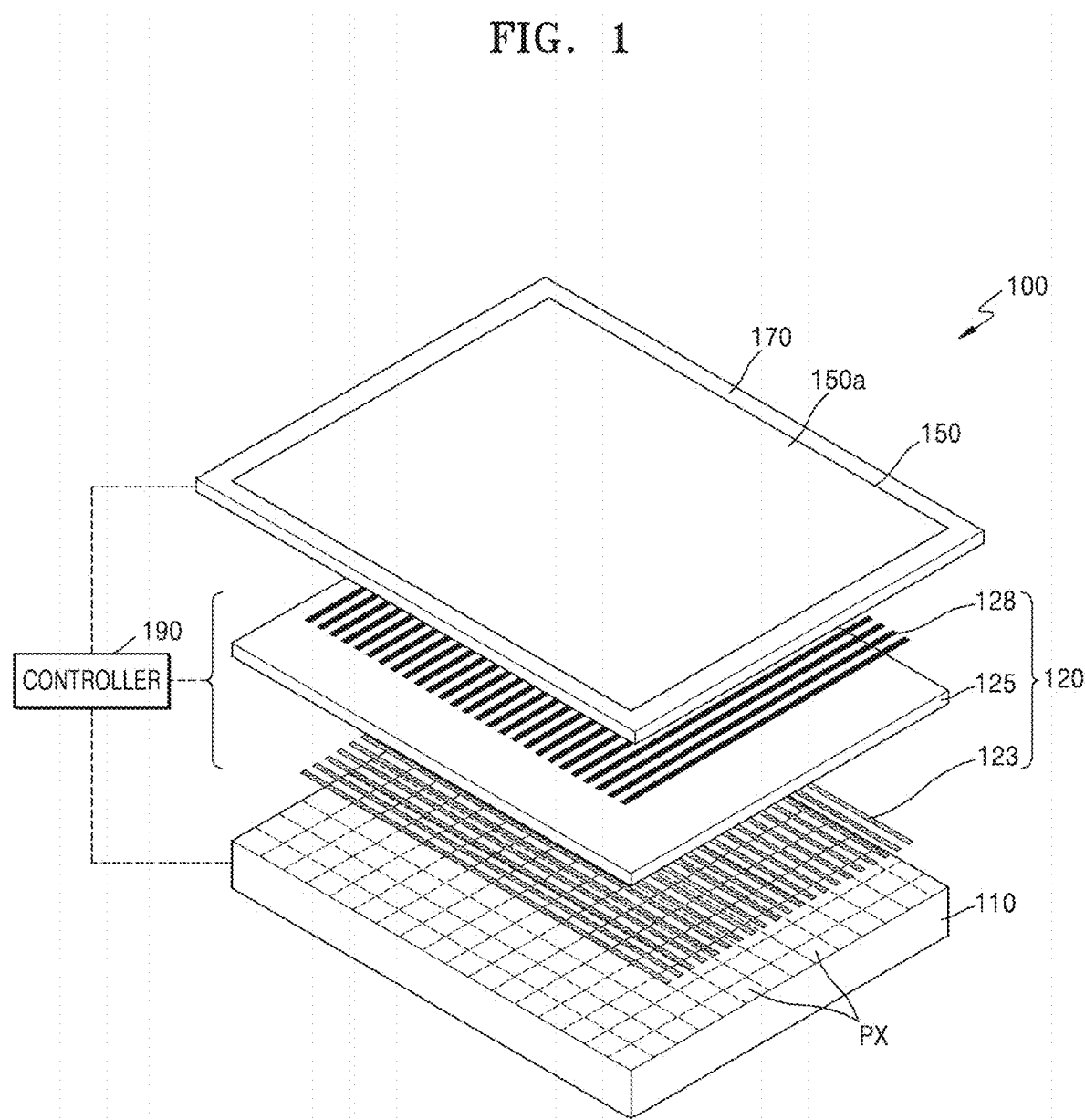
FIG. 1 is an exploded perspective view illustrating a configuration of an apparatus for recognizing a fingerprint, according to an example embodiment.

Example embodiments will now be described more fully with reference to the accompanying drawings. In the drawings, the same reference numerals denote the same elements and the thicknesses of layers and regions and the sizes of components may be exaggerated for clarity and convenience. The present disclosure may have different forms and may not be construed as limited to the example embodiments set forth herein.

For example, it will also be understood that when a layer is referred to as being "on" another layer or a substrate, it can be directly on the other layer or the substrate, or intervening layers may also be present therebetween.

It will be understood that although the terms "first," "second," etc. may be used herein to describe various elements, these elements may not be limited by these terms. These elements are only used to distinguish one element from another.

As used herein, the singular forms "a," "an," and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

In addition, terms such as ". . . unit," ". . . module," or the like refer to units that perform at least one function or operation, and the units may be implemented as hardware or software or as a combination of hardware and software.

Expressions such as "at least one of," when preceding a list of elements, modify the entire list of elements and do not modify the individual elements of the list.

Figure 2:
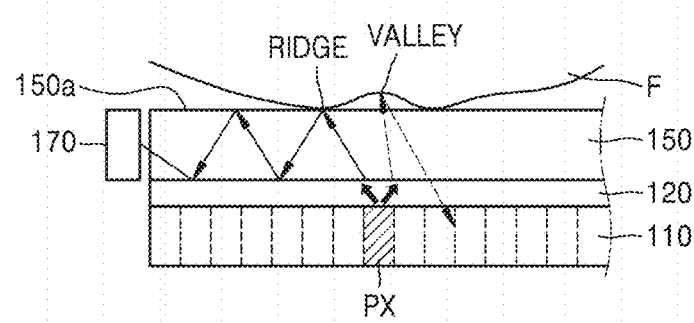
FIG. 2 is a conceptual view for explaining that the apparatus of FIG. 1 uses pixels of a display device as a light source for fingerprint recognition, and that an optical path of reflected light varies according to a fingerprint profile.

FIG. 1 is an exploded perspective view illustrating a configuration of an apparatus 100 for recognizing a fingerprint, according to an example embodiment. FIG. 2 is a conceptual view for explaining that the apparatus 100 of FIG. 1 uses pixels PX of a display device 110 as a light source for fingerprint recognition, and that an optical path of reflected light varies according to a fingerprint profile.

The apparatus 100 includes the display device 110 including the plurality of pixels PX that are controlled to be turned on or off according to an image signal, a transparent cover 150 provided on the display device 110 and having a touch surface 150a through which a touch of a user is input, a touch sensor 120 configured to recognize a location of the touch (referred to as 'touch location') input by the user through the touch surface 150a, a fingerprint sensor 170 configured to detect reflected light reflected from the touch surface 150a due to a fingerprint of the user who inputs the touch, and a controller 190 (e.g., a processor) configured to drive one or more of the pixels PX corresponding to the touch location and calculate a fingerprint profile from a signal detected by the fingerprint sensor 170.

The apparatus 100 according to an example embodiment uses an optical fingerprint recognition method. That is, the apparatus 100 emits light for fingerprint recognition to the touch surface 150a that is touched by the user with his/her finger. In this case, the apparatus 100 uses the pixels PX of the display device 110 as a light source for fingerprint recognition.

The display device 110 includes the plurality of pixels PX, and the plurality of pixels PX are controlled to be turned on or off according to an image signal to form an image. The display device 110 also applies light for fingerprint recognition to a desired location of the touch surface 150. When a touch location input through the touch surface 150a is sensed by the touch sensor 120, one or more of the pixels PX that may emit light to the touch location are selected and are turned on. The display device 110 may be an organic light-emitting display device or a liquid crystal display device. When the display device 110 is a liquid crystal display device, a backlight for applying light for forming an image may be further provided.

A resolution of the display device 110 may be high enough to distinguish ridges and valleys of a fingerprint profile. Considering that pitches of the ridges and the valleys are about 400 μm, a width of one pixel has to be less than 400 μm. A resolution of the display device 110 may be greater than or equal to 300 pixels per inch (PPI) or 500 PPI.

The touch sensor 120 is provided to recognize a touch location input by the user through the touch surface 150a. The touch sensor 120 may be, for example, a capacitive sensor. A capacitive sensor detects a change in a capacitance due to a touch of the user. The touch sensor 120 includes a driving electrode 123 including a plurality of electrodes, and a detection electrode 128 spaced apart from the driving electrode 123 and including a plurality of electrodes arranged to intersect the electrodes of the driving electrode 123. An insulating film 125 is located between the driving electrode 123 and the detection electrode 128. A change in a capacitance may occur due to a touch at nodes where the plurality of electrodes of the driving electrode 123 and the detection electrode 128 intersect each other, and coordinates of the touch may be calculated from the change in the capacitance at the plurality of nodes.

A configuration of the touch sensor 120 is an example and may be modified in various ways as long as the touch sensor 120 may recognize a touch of the user. For example, although the electrodes of the driving electrode 123 and the detection electrode 128 of the touch sensor 120 have stripe shapes with uniform widths, the present disclosure is not limited thereto and the electrodes may have any of various other shapes such as diamond shapes or shapes with different widths. Also, the touch sensor 120 is not limited to a capacitive sensor.

The transparent cover 150 has the touch surface 150a through which a touch of the user may be input, and may protect the display device 110 and the touch sensor 120. The transparent cover 150 may be a cover glass provided on an outermost surface of a display panel. The transparent cover 150 may be formed of any of glass and transparent plastic materials.

The fingerprint sensor 170 senses reflected light that is output from the pixels PX of the display device 110 and is reflected from the touch surface 150a. The reflected light from the touch surface 150a propagates inside the transparent cover 150 by total internal reflection and reaches edges of the transparent cover 150. Accordingly, to sense the reflected light, the fingerprint sensor 170 may be located near the edges of the transparent cover 150. As shown in FIG. 1, the fingerprint sensor 170 may surround, but not be limited to, an entire outer surface of the transparent cover 150.

The fingerprint sensor 170 that is an optical sensor for detecting reflected light may be a photodiode or a photoconductor. Also, an additional element such as a circuit element for measuring a change in a resistance in the photoconductor or a light focusing member for focusing light to the photodiode, may be further provided, which will be explained below with reference to FIGS. 6 through 9.

Referring to FIG. 2, when one or more of the pixels PX that are to be used as a light source for fingerprint recognition are selected by the display device 110, the pixels PX are turned on and light is applied to the touch surface 150a. A direction of reflected light varies according to a profile, for example, the existence of ridges or valleys, of a fingerprint of a finger F that touches the touch surface 150a.

The ridges of the fingerprint contact the touch surface 150a, and light output from the pixels PX and reaching the ridges of the fingerprint is reflected in various directions. The reflected light is totally internally reflected in the transparent cover 150 and travels to edges thereof. The reflected light is sensed by the fingerprint sensor 170 located near the edges. Such an optical path is marked by solid arrows in FIG. 2.

The valleys of the fingerprint do not contact the touch surface 150, and thus an empty space may be formed between the valleys and the touch surface 150a. The transparent cover 150 has a refractive index greater than 1, and the empty space includes air having a refractive index less than the refractive index of the transparent cover 150. Accordingly, light from the pixels PX may be totally reflected at a boundary between the empty space and the transparent cover 150, and the amount of light reaching the valleys of the fingerprint is relatively reduced. The light reaching the valleys of the fingerprint is light incident on the touch surface 150a at an angle less than a total reflection critical angle. Accordingly, when the light is reflected from the valleys of the fingerprint, the light is highly likely to reach the touch surface 150a at an angle less than the total reflection critical angle and highly likely to travel downward from the transparent cover 150. Such an optical path is marked by a dashed arrow in FIG. 2.

In other words, not only the amount of light output from the pixels PX and reaching the valleys of the fingerprint is less than the amount of light output from the pixels PX and reaching the ridges of the fingerprint, but also the amount of reflected light traveling to the edges of the transparent cover 150 is small.

Because the fingerprint sensor 170 is located near the edges of the transparent cover 150, it may be determined whether a fingerprint profile of a location corresponding to the pixels PX that are turned on corresponds to ridges or valleys by analyzing the amount of light sensed by the fingerprint sensor 170.

Figure 3:
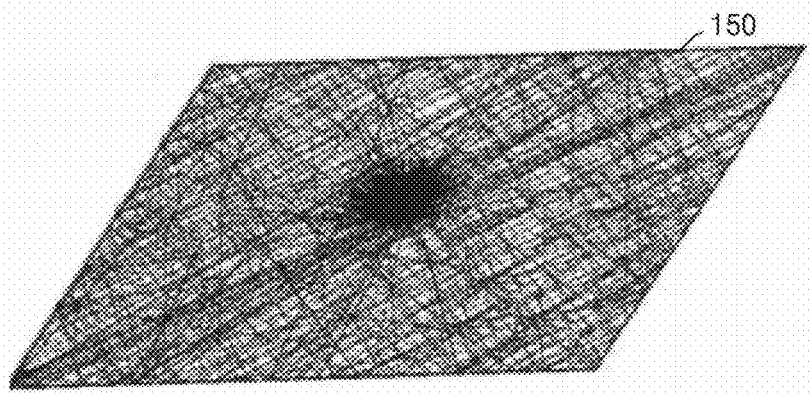
FIGS. 3 and 4 are computer simulation images respectively illustrating optical paths along which reflected light from a touch surface due to ridges and valleys of a fingerprint reaches edges of a transparent cover of FIG. 1.
Figure 4:
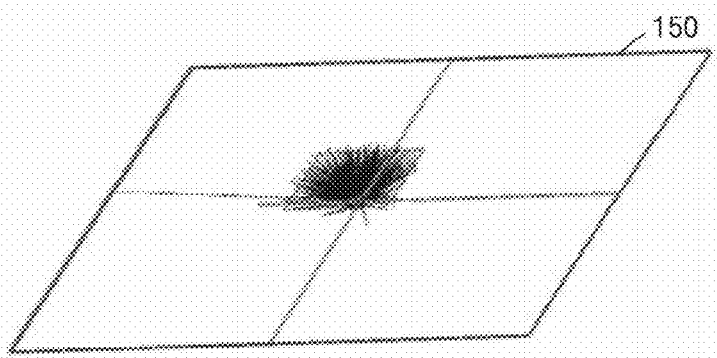

FIGS. 3 and 4 are computer simulation images respectively illustrating optical paths along which reflected light from the touch surface 150a due to ridges and valleys of a fingerprint reaches edges of the transparent cover 150 of FIG. 1.

A computer simulation was performed with an amount of light per pixel of 4.0×10−6 Lumen@500 cd/m2.

Referring to FIG. 3, reflected light due to ridges of a fingerprint randomly travels to four edges of the transparent cover 150. The following table shows the amount of the reflected light.

|  | The amount of light | Unit |
| --- | --- | --- |
| The amount of input light | 4.00E−06 | Lumen |
| The amount of detected light | 1.43E−10 | Lumen |

Referring to FIG. 4, reflected light due to valleys of a fingerprint hardly reaches edges of the transparent cover 150. The following table shows the amount of the reflected light.

|  | The amount of light | Unit |
|---|---|---|
| The amount of input light | 4.00E−06 | Lumen |
| The amount of detected light | 1.10E−07 | Lumen |

Upon examining computer simulation results, an intensity of reflected light due to ridges of a fingerprint is about 1000 times greater than that of reflected light due to valleys of the fingerprint, and thus ridges and valleys of a fingerprint may be distinguished by analyzing an intensity of reflected light. Also, 1.10E-07 Lumens is a value that may be detected by a photodiode.

Figure 5:
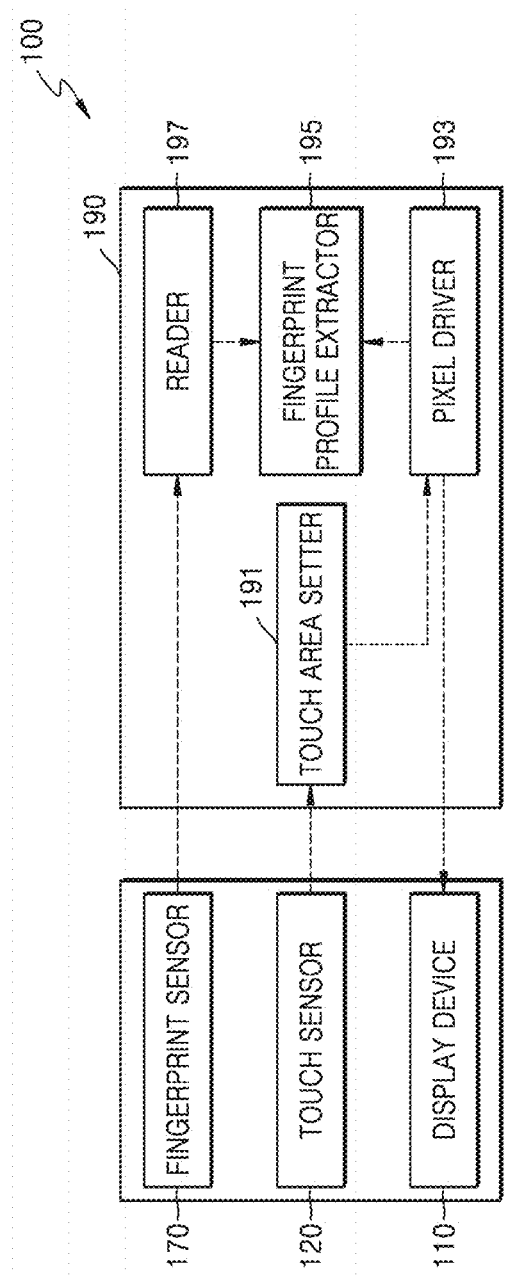
FIG. 5 is a block diagram illustrating a detailed configuration of the apparatus of FIG. 1 for recognizing a fingerprint.

FIG. 5 is a block diagram illustrating a detailed configuration of the apparatus 100 of FIG. 1 for recognizing a fingerprint.

The apparatus 100 includes the display device 110, the touch sensor 120, the fingerprint sensor 170, and the controller 190.

The controller 190 may drive one or more of the pixels PX corresponding to a touch location, and may image a fingerprint profile from a signal detected by the fingerprint sensor 170. To this end, the controller 190 includes, for example, a touch area setter 191, a pixel driver 193, a reader 197, and a fingerprint profile extractor 195.

The touch area setter 191 may set a touch area having a predetermined size and including a touch location recognized by the touch sensor 120.

The pixel driver 193 drives pixels corresponding to the touch location. To this end, the pixel driver 193 may select pixels corresponding to the touch area set by the touch area setter 191 and may sequentially drive the pixels one by one. That is, the pixels corresponding to the set touch area may be sequentially turned on and off.

The reader 197 may determine the existence of valleys or ridges of a fingerprint from a signal detected by the fingerprint sensor 170. As described above, because the amount of light detected by the fingerprint sensor 170 greatly varies according to the existence of the valleys or the ridges of the fingerprint, a fingerprint profile corresponding to the driven pixels may be determined according to the amount of detected light. Alternatively, when it is difficult to detect the amount of reflected light due to the valleys of the fingerprint according to the performance or a sensitivity of an optical sensor included in the fingerprint sensor 170, it may be determined that when light is detected by the fingerprint sensor 170, the ridges exist, and when light is not detected by the fingerprint sensor 170, the valleys exist.

The fingerprint profile extractor 195 may extract a fingerprint profile by associating the pixels driven by the pixel driver 193 with a determination result of the reader 197. Whenever the pixels selected by the pixel driver 193 are turned on and off one by one, reflected light is detected by the fingerprint sensor 170. The existence of the ridges or the valleys is determined according to a detection result. The fingerprint profile may be imaged by combining determined pieces of information about the fingerprint profile according to locations.

Figure 6:
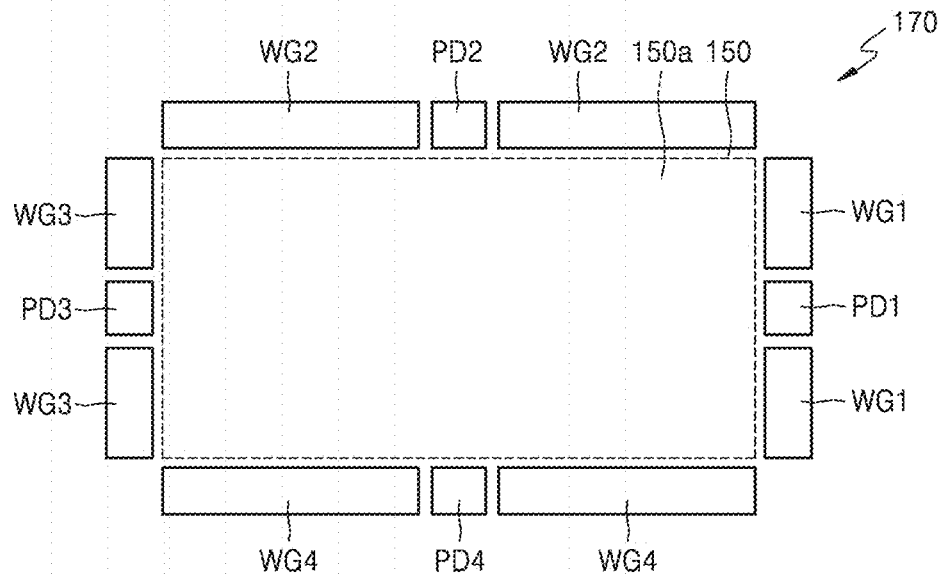
FIG. 6 is a plan view illustrating a configuration of a fingerprint sensor that may be employed by the apparatus of FIG. 1, according to an example embodiment.
Figure 7:
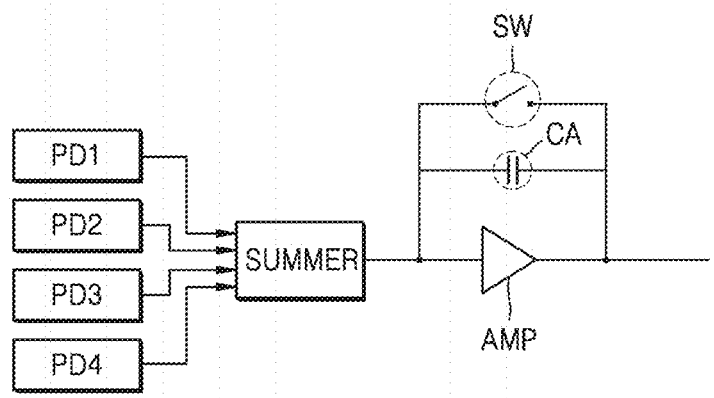
FIG. 7 is a circuit diagram of the fingerprint sensor of FIG. 6.

FIG. 6 is a plan view illustrating a configuration of the fingerprint sensor 170 that may be employed by the apparatus 100 of FIG. 1, according to an example embodiment. FIG. 7 is a circuit diagram of the fingerprint sensor 170 of FIG. 6.

The fingerprint sensor 170 may be located near edges of the transparent cover 150. Because reflected light from the touch surface 150a reaches various positions on the edges of the transparent cover 150, the fingerprint sensor 170 includes, for example, a plurality of photodiodes PD1, PD2, PD3, and PD4 to sense all reflected light reaching the edges of the transparent cover 150. The plurality of photodiodes PD1, PD2, PD3, and PD4 may be respectively located near four side surfaces of the transparent cover 150. Also, for example, light focusing members WG1, WG2, WG3, and WG4 for focusing light are respectively further provided for the plurality of photodiodes PD1, PD2, PD3, and PD4. The light focusing members WG1, WG2, WG3, and WG4 may be waveguides. The light focusing members WG1, WG2, WG3, and WG4 may transmit light reflected from the touch surface 150a and traveling to the edges of the transparent cover 150 to the photodiodes PD1, PD2, PD3, and PD4. Input couplers for enabling light traveling to the edges of the transparent cover 150 to be effectively incident on the light focusing members WG1, WG2, WG3, and WG4 may be further provided on the light focusing members WG1, WG2, WG3, and WG4.

Although one photodiode is located near each of the four side surfaces of the transparent cover 150 in FIG. 6, the present disclosure is not limited thereto. A plurality of photodiodes may be located near each side surface, or photodiodes may not be located near some side surfaces. That is, the number of photodiodes is not limited. When there is one photodiode, because the photodiode uses a light focusing member for focusing light to all edges of the transparent cover 150, the light focusing member may be designed to have high efficiency. Signal processing for sensing light may be simplified. When there are a plurality of photodiodes, a light focusing member may be relatively easily designed but signal processing from each of the photodiodes may be complicated.

Referring to FIG. 7, the fingerprint sensor 170 further includes, for example, an amplifier AMP for amplifying a signal from a photodiode. Also, the fingerprint sensor 170 further includes, for example, a summer for summing signals from the plurality of photodiodes PD1, PD2, PD3, and PD4.

As shown in FIG. 7, the plurality of photodiodes PD1, PD2, PD3, and PD4 may be connected to the summer to sum signals from the plurality of photodiodes PD1, PD2, PD3, and PD4. Also, the amplifier AMP for amplifying a signal from the summer may be further provided. For example, a capacitor CA and a switching device SW are connected in parallel to both ends of the amplifier AMP. That is, one end of each of the capacitor CA and the switching device SW is connected to an input terminal of the amplifier AMP, and the other end of each of the capacitor CA and the switching device SW is connected to an output terminal of the amplifier AMP. The switching device SW may include a transistor.

When the switching device SW is turned off, electrical signals from the photodiodes PD1, PD2, PD3, and PD4 are summed by the summer, and the capacitor CA is charged due to a signal from the summer. Charges stored in the capacitor CA may be amplified and output by the amplifier AMP. When the switching device SW is turned on, the charges stored in the capacitor CA are discharged. That is, a mode is changed so that reflected light when pixels corresponding to another location are driven may be sensed.

As such, when a plurality of pixels are sequentially turned on and off according to an on-state or off-state of the switching device SW, a corresponding signal may be amplified and output.

Figure 8:
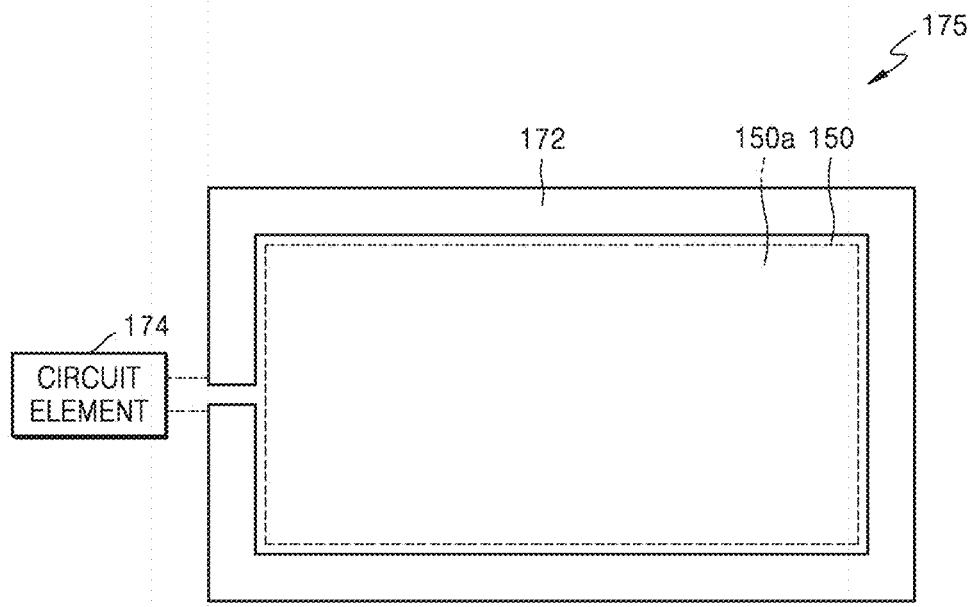
FIG. 8 is a plan view illustrating a configuration of the fingerprint sensor that may be employed by the apparatus of FIG. 1, according to another example embodiment.
Figure 9:
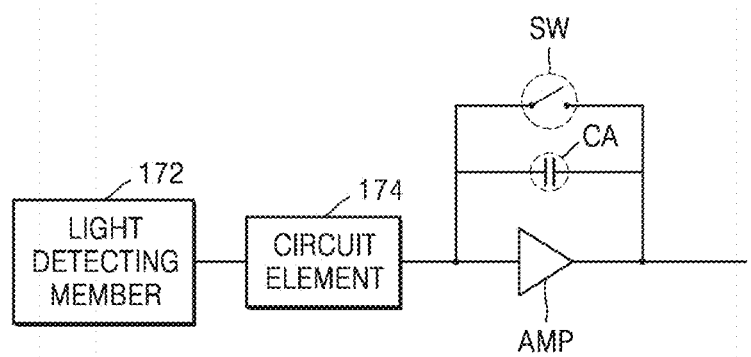
FIG. 9 is a circuit diagram of the fingerprint sensor of FIG. 8.

FIG. 8 is a plan view illustrating a configuration of the fingerprint sensor 170 that may be employed by the apparatus 100 of FIG. 1, according to another example embodiment. FIG. 9 is a circuit diagram of the fingerprint sensor 170 of FIG. 8.

Referring to FIG. 8, a fingerprint sensor 175 may surround the transparent cover 150, and includes, for example, a light detecting member 172 formed of a photoconductive material, and a circuit element 174 for measuring a change in an electrical resistance of the light detecting member 172 due to light.

The transparent cover 150 has, for example, the touch surface 150a and a plurality of side surfaces connected to the touch surface 150a, and the light detecting member 172 may surround the plurality of side surfaces. The light detecting member 172 may be formed of a photoelectric conversion material that becomes electrically conductive due to light. The photoelectric conversion material refers to a material that has properties of a dielectric material when light is not emitted thereto and has properties of a conductive material when light is emitted thereto. The light detecting member 172 may be formed of a photoconductive material that generates charges in response to light. The light detecting member 172 may generate charges in response to, for example, visible light. The light detecting member 172 may be formed of, for example, amorphous silicon (a-Si).

When reflected light from the touch surface 150a travels in the transparent cover 150, reaches edges of the transparent cover 150, and is incident on the light detecting member 172 near the transparent cover 150, electrons are excited to a conduction band due to the energy of the incident light. Charges in the conduction band move in a direction of an electric field. The total amount of the reflected light reaching the edges of the transparent cover 150 may be analyzed by collecting the moving charges.

The circuit element 174 may be configured to form an electric field along which charges generated by the light detecting member 172 may move, and to collect the moving charges. Although the light detecting member 172 integrally surrounds side surfaces of the transparent cover 150 in FIG. 8, the present disclosure is not limited thereto. For example, the circuit element 174 and the light detecting member 172 may constitute an equivalent circuit in which a plurality of variable resistors are connected in parallel.

Referring to FIG. 9, the fingerprint sensor 175 further includes, for example, the amplifier AMP for amplifying a signal output from the light detecting member 172.

As shown in FIG. 9, for example, the light detecting member 172 is connected to the amplifier AMP through the circuit element 174. For example, the capacitor CA and the switching device SW are connected in parallel to both ends of the amplifier AMP. That is, one end of each of the capacitor CA and the switching device SW is connected to an input terminal of the amplifier AMP, and the other end of each of the capacitor CA and the switching device SW is connected to an output terminal of the amplifier AMP.

When the switching device SW is turned off, the capacitor CA may be charged due to an electrical signal from the light detecting member 172, and charges stored in the capacitor CA may be amplified and output by the amplifier AMP. When the switching device SW is turned on, the charges stored in the capacitor CA are discharged. That is, a mode is changed so that reflected light when pixels corresponding to another location are driven may be sensed. As such, when a plurality of pixels are sequentially turned on and off according to an on-state or off-state of the switching device SW, a corresponding signal may be amplified and output.

The configurations of FIGS. 7 and 9 are examples, and may be modified in various ways to efficiently process a signal from the fingerprint sensor 170 or 175.

Figure 10:
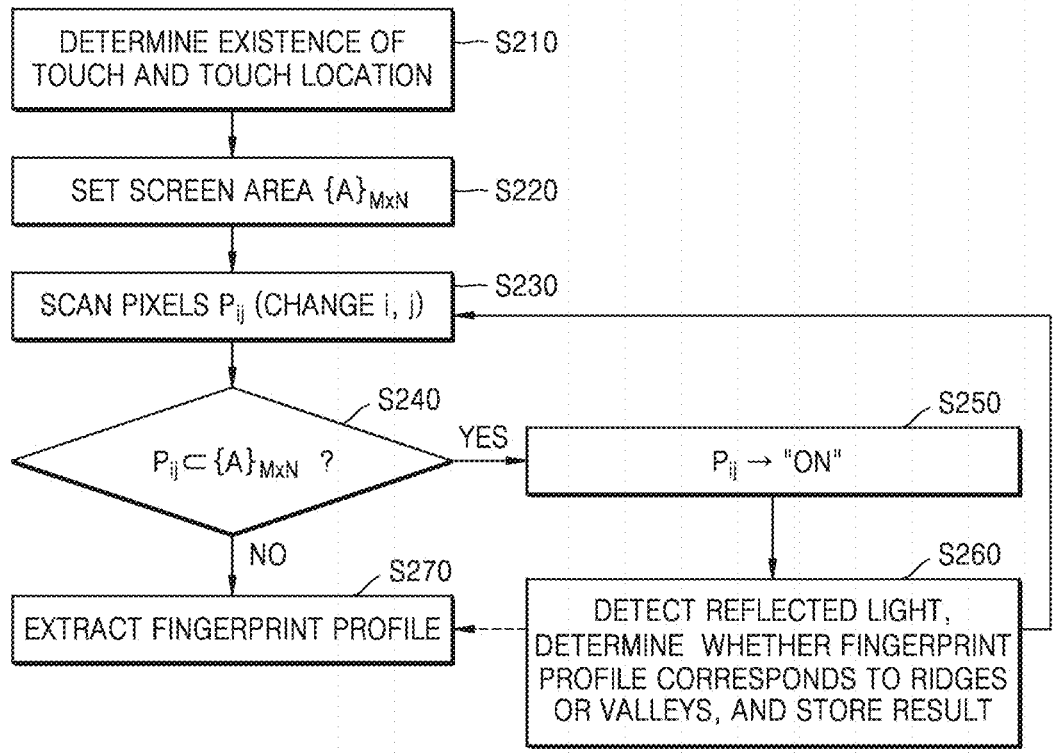
FIG. 10 is a flowchart of a method of recognizing a fingerprint, according to an example embodiment.

FIG. 10 is a flowchart of a method of recognizing a fingerprint, according to an example embodiment.

The method according to an example embodiment includes emitting light for fingerprint recognition to a touch surface by using a display device including a plurality of display pixels and detecting reflected light of the light for fingerprint recognition due to a fingerprint of a user.

The method may be performed by, but not limited to, the apparatus 100.

The method will now be explained in detail.

In operation S210, to execute a fingerprint recognition operation, the existence of a touch of a user and a touch location are determined. The user may input a touch on a screen. A location (referred to as 'touch location') desired by the user on a screen where an image is displayed may be touched according to the image displayed on the screen. A touch sensor, for example, a capacitive touch sensor, may detect a change in a capacitance due to the touch and may determine the existence of the touch and the touch location.

Next, in operation S220, a screen area $\{A\}_{M \times N}$ with a predetermined size including the touch location is set. An area facing M×N pixels may be set as the screen area $\{A\}_{M \times N}$.

Next, in operation S230, selected pixels $PX_{ij}$ of a display device are scanned. In operation S240, it is determined whether the selected pixels $PX_{ij}$ are included in the screen area $\{A\}_{M \times N}$.

When it is determined in operation S240 that the selected pixels $PX_{ij}$ are included in the set screen area $\{A\}_{M \times N}$, the method proceeds to operation S250. In operation S250, the selected pixels $PX_{ij}$ are driven to turn on. As the selected pixels $PX_{ij}$ are driven, in operation S260, when light output from the selected pixels $PX_{ij}$ reaches the touch location of the user, that is, a fingerprint location, reflected light is detected, it is determined whether a fingerprint profile of the fingerprint location corresponds to ridges or valleys, and a determination result is stored. Because the amount of detected light greatly varies according to whether the fingerprint profile of the touch location corresponds to the ridges or the valleys, the fingerprint profile of the touch location corresponding to the driven selected pixels $PX_{ij}$ may be determined by using the amount of detected light. Alternatively, it may be determined that when light is detected, the ridges exist, and when light is not detected, the valleys exist.

Operations S250 and S260 are repeatedly performed until all of the selected pixels $PX_{ij}$ included in the set screen area $\{A\}_{M \times N}$ are scanned.

After all of the selected pixels $PX_{ij}$ included in the set screen area $\{A\}_{M \times N}$ are scanned, the method proceeds to operation S270. In operation S270, the fingerprint profile is extracted by combining stored information, that is, pieces of information about the fingerprint location and the existence of the ridges or the valleys according to locations.

After the fingerprint profile is extracted, whether to perform authentication may be determined according to the purpose of the method, and whether to perform an operation attempted by the user through the touch may be determined.

Figure 11:
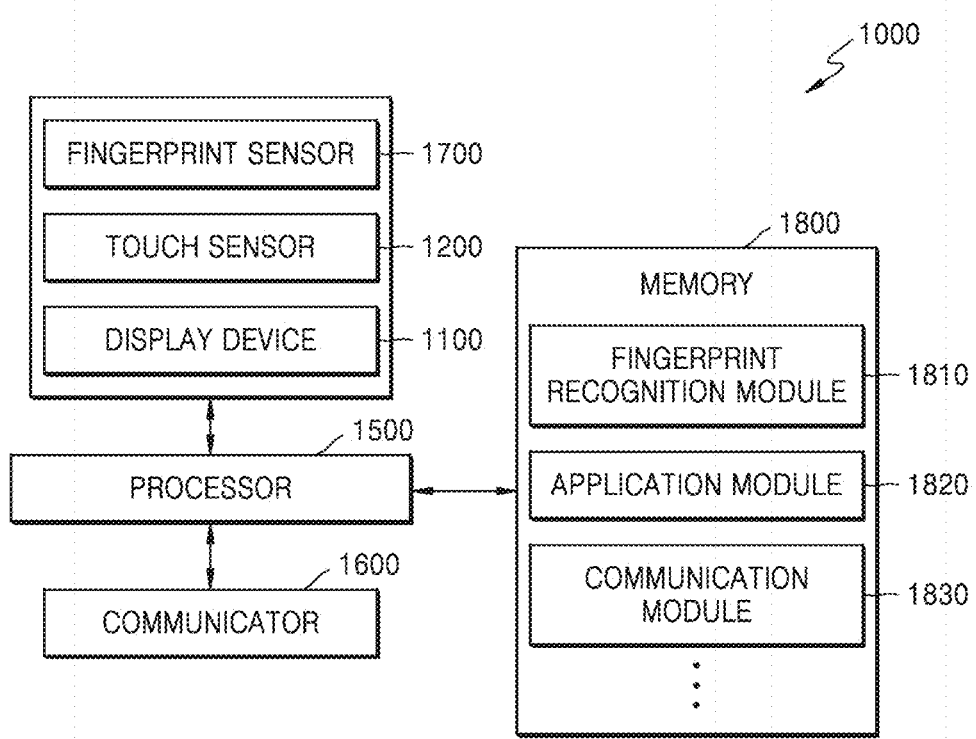
FIG. 11 is a block diagram illustrating a configuration of an electronic device, according to an example embodiment.

FIG. 11 is a block diagram illustrating a configuration of an electronic device 1000, according to an example embodiment.

The electronic device 1000 may be, for example, a portable mobile communication device, a smartphone, or a smart watch.

The electronic device 1000 includes, for example, a display device 1100, a touch sensor 1200, a fingerprint sensor 1700, and a processor 1500 for controlling the display device 1100, the touch sensor 1200, and the fingerprint sensor 1700. The electronic device 1000 also includes, for example, a communicator 1600 and a memory 1800.

Configurations and an arrangement of the display device 1100, the touch sensor 1200, and the fingerprint sensor 1700 may be substantially the same as, but not limited to, those of the apparatus 100 of FIG. 1.

The processor 1500 processes and controls the electronic device 1000. The processor 1500 may recognize a fingerprint of a user that is input through a touch surface of the electronic device 1000, as described above, by executing a program, for example, a fingerprint recognition module 1810, stored in the memory 1800. For example, the processor 1500 may recognize a touch location, may drive pixels corresponding to the touch location, and may control the touch sensor 1200, the display device 1100, and the fingerprint sensor 1700 to sense reflected light. Also, the processor 1500 may determine whether to perform authentication by performing fingerprint matching according to a recognized fingerprint image, and may execute a command corresponding to the touch location.

The memory 1800 may store a program for processing and controlling operations of the processor 1500. The program stored in the memory 1800 may include the fingerprint recognition module 1810. The fingerprint recognition module 1810 may be a program for performing functions of the touch area setter 191, the pixel driver 193, the reader 197, and the fingerprint profile extractor 195 as described above with reference to FIG. 5.

In addition, an application module 1820 for various applications to be executed by the electronic device 1000 and/or a communication module 1830 for communication may be stored in the memory 1800. Also, fingerprint data previously stored for authentication of the user and a matching program for fingerprint matching may be stored in the memory 1800. Also, a camera module, a video reproduction module, and an audio reproduction module may be further stored, as a program for driving an apparatus provided in the electronic device 1000, in the memory 1800.

The memory 1800 may include at least one storage medium among a flash memory type, a hard disk type, a multimedia card micro type, a card type memory (e.g., an SD or an XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

The communicator 1600 may communicate with an external device through, but not limited, Bluetooth communication, Bluetooth low energy (BLE) communication, near field communication, WLAN communication, Zigbee communication, infrared data association (IrDA) communication, Wi-Fi Direct (WFD) communication, UWB (ultra wideband (UWB) communication, Ant+ communication, and WIFI communication.

The device described herein may include a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer-readable codes executable on a processor on a computer-readable medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network coupled computer systems so that the computer-readable code is stored and executed in a distributive manner. This media can be read by the computer, stored in the memory, and executed by the processor.

The implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It may be noted that many alternative or additional functional relationships, physical connections or logical connections may be present in a practical device.

Because the apparatus uses display pixels as a light source for fingerprint recognition, the apparatus may recognize a fingerprint on an arbitrary area of a display screen.

Because the apparatus minimizes an additional element for fingerprint recognition, a structure is simple and a system is easily configured.

The apparatus may be applied to various electronic devices such as a smartphone and a smart watch.

While this present disclosure has been shown and described with reference to the example embodiments thereof, it will be understood by one of ordinary skill in the art that various changes in form and details may be made therein without departing from the spirit and scope of the present disclosure as defined by the appended claims. The example embodiments may be considered in a descriptive sense only and not for purposes of limitation. Therefore, the scope of the present disclosure is defined not by the detailed description of the present disclosure but by the appended claims, and all differences within the scope will be construed as being included in the present disclosure.

What is claimed is:

1. An apparatus for recognizing a fingerprint, the apparatus comprising:
    a display device comprising a plurality of pixels configured to be turned on and off based on an image signal;
    a transparent cover disposed on the display device, the transparent cover comprising a touch surface through which a touch of a user is input;
    a touch sensor configured to recognize a touch location of the touch input through the touch surface;
    a fingerprint sensor configured to generate a signal due to the fingerprint of the user inputting the touch; and
    a processor implementing a controller configured to determine a fingerprint profile of the fingerprint, based on the signal generated by the fingerprint sensor,
    wherein the controller is further configured to select pixels corresponding to the touch location among the plurality of pixels, and turn on the selected pixels as a light source for a fingerprint recognition of the fingerprint sensor, and the fingerprint sensor is further configured to detect light that is emitted from the selected pixels and is reflected by the fingerprint, and generate the signal based on the light that is detected.

2. The apparatus of claim 1, wherein the transparent cover further comprises side surfaces connected to the touch surface, and the fingerprint sensor comprises one or more photodiodes disposed adjacent to one or more of the side surfaces.

3. The apparatus of claim 2, wherein the one or more photodiodes are respectively disposed adjacent to the side surfaces.

4. The apparatus of claim 2, wherein the fingerprint sensor further comprises one or more light focusing members configured to focus light from the side surfaces to the one or more photodiodes.

5. The apparatus of claim 2, wherein the fingerprint sensor further comprises a summer configured to sum signals that are generated by the one or more photodiodes.

6. The apparatus of claim 5, wherein the fingerprint sensor further comprises an amplifier configured to amplify the signals summed by the summer.

7. The apparatus of claim 5, wherein the fingerprint sensor further comprises a switching device configured to switch the signals summed by the summer.

8. The apparatus of claim 1, wherein the transparent cover further comprises side surfaces connected to the touch surface, and the fingerprint sensor comprises:
a light detecting member surrounding the side surfaces, and comprising a photoconductive material; and
a circuit element configured to measure a change in an electrical resistance of the light detecting member due to the light that is incident on the light detecting member.

9. The apparatus of claim 8, wherein the fingerprint sensor further comprises an amplifier configured to amplify the signal that is generated by the light detecting member.

10. The apparatus of claim 8, wherein the fingerprint sensor further comprises a switching device configured to switch the signal that is generated by the light detecting member.

11. The apparatus of claim 1, wherein the controller comprises:
a pixel driver configured to drive the pixels corresponding to the location of the touch;
a reader configured to determine either one or both of valleys and ridges of the fingerprint, based on the signal generated by the fingerprint sensor; and
a fingerprint profile extractor configured to extract the fingerprint profile by associating the pixels driven by the pixel driver with either one or both of the valleys and ridges determined by the reader.

12. The apparatus of claim 11, wherein the controller further comprises a touch area setter configured to set a touch area to be a predetermined size comprising the location of the touch.

13. The apparatus of claim 12, wherein the pixel driver is further configured to sequentially drive pixels in the touch area set by the touch area setter, among the plurality of pixels, and the reader is further configured to determine either one or both of the valleys and the ridges of the fingerprint, in synchronization with the driving of the pixel driver.

14. The apparatus of claim 1, wherein a resolution of the display device is greater than or equal to 500 pixels per inch.

15. An electronic device comprising the apparatus of claim 1.

16. A method of recognizing a fingerprint, the method comprising:
recognizing a touch location of a user that is input through a touch surface;
selecting pixels corresponding to the touch location among a plurality of pixels included in a display device;
emitting light to the touch location from the selected pixels as a light source for a fingerprint recognition; and
detecting light that is emitted from the selected pixels and is reflected by the fingerprint of the user.

17. The method of claim 16, further comprising:
setting a screen area for recognizing the fingerprint, based on the touch location,
wherein the emitting of the light for the fingerprint recognition comprises sequentially driving pixels corresponding to the screen area among the plurality of pixels.

18. The method of claim 17, wherein the detecting of the light reflected from the touch surface comprises detecting the light reflected from the touch surface in synchronization with the driving of the pixels corresponding to the screen area, and the method further comprises:
determining either one or both of valleys and ridges of the fingerprint, based on the light that is detected; and
determining a fingerprint profile by associating the pixels that are driven with either one or both of the valleys and ridges that are determined.

19. The method of claim 16, wherein the detecting of the light reflected from the touch surface comprises detecting the light reflected from the touch surface, using a photodiode or a photoconductor.

20. An apparatus for recognizing a fingerprint, the apparatus comprising:
a display device comprising a plurality of pixels;
a transparent cover disposed on the display device, the transparent cover comprising a touch surface through which a touch is input;
a touch sensor disposed between the display device and the transparent cover, and configured to recognize a touch location of the touch input through the touch surface;
a fingerprint sensor surrounding the touch surface, the fingerprint sensor being configured to generate a signal due to the fingerprint of a user inputting the touch; and
a processor implementing a controller configured to determine a fingerprint profile of the fingerprint, based on the signal generated by the fingerprint sensor;
wherein the controller is further configured to select pixels corresponding to the touch location among the plurality of pixels, and turn on the selected pixels as a light source for a fingerprint recognition of the fingerprint sensor, and
the fingerprint sensor is further configured to detect light that is emitted from the selected pixels and is reflected by the fingerprint.

* * * * *